(12) United States Patent
Yuan et al.

(10) Patent No.: US 7,421,652 B2
(45) Date of Patent: Sep. 2, 2008

(54) METHODS AND APPARATUS FOR SUMMARIZING DOCUMENT CONTENT FOR MOBILE COMMUNICATION DEVICES

(75) Inventors: Jianwei Yuan, Cumming, GA (US); Olav A. Sylthe, Atlanta, GA (US)

(73) Assignee: Arizan Corporation, Atlanta, GA (US)

( * ) Notice: Subject to any disclaimer, the term of this patent is extended or adjusted under 35 U.S.C. 154(b) by 398 days.

(21) Appl. No.: 10/693,736

(22) Filed: Oct. 24, 2003

(65) Prior Publication Data
US 2004/0139397 A1  Jul. 15, 2004

Related U.S. Application Data

(60) Provisional application No. 60/422,760, filed on Oct. 31, 2002.

(51) Int. Cl.
*G06F 17/00* (2006.01)
*G06F 17/21* (2006.01)
*G06F 17/24* (2006.01)

(52) U.S. Cl. .................. 715/254; 715/200; 715/204; 715/212; 715/215; 715/227; 715/234; 715/238; 715/239; 715/242; 715/255

(58) Field of Classification Search .................. 715/530, 715/523, 511, 517, 200, 204, 212, 215, 227, 715/234, 238–239, 242, 254–255
See application file for complete search history.

(56) References Cited

U.S. PATENT DOCUMENTS

| | | | |
|---|---|---|---|
| 6,457,030 B1 | 9/2002 | Adams et al. | |
| 6,523,040 B1 | 2/2003 | Lo et al. | |
| 6,925,595 B1 * | 8/2005 | Whitledge et al. | 715/513 |
| 2001/0056445 A1 | 12/2001 | Meystel et al. | |
| 2002/0016801 A1 * | 2/2002 | Reiley et al. | 707/523 |

(Continued)

FOREIGN PATENT DOCUMENTS

EP  0 933 712 A2  8/1999

(Continued)

OTHER PUBLICATIONS

Supplementary European Search Report (EP 03 78 6541) dated Nov. 20, 2007.

*Primary Examiner*—Rachna Singh
*Assistant Examiner*—Chau Nguyen
(74) *Attorney, Agent, or Firm*—Jones Day; Krishna K. Pathiyal; Robert C. Liang

(57) ABSTRACT

A document summary which includes an assemblage of a plurality of summary entries is generated for an electronic document. In the generation of the document summary, a content structure or properties within the electronic document are analyzed. The plurality of summary entries are selected from the contents of the electronic document based on the analysis of the content structure or properties. The content structure within the electronic document may include a table of contents, a plurality of spreadsheet worksheets, a plurality of document pages, etc. The content properties within the electronic document may include text formatting, paragraph formatting, paragraph sizing, etc. Preferably, the best available content structure or properties within the electronic document is identified and utilized in the selection of the plurality of summary entries. The document summary is provided to a mobile communication device in response to a request for the electronic document.

11 Claims, 6 Drawing Sheets

U.S. PATENT DOCUMENTS

| | | |
|---|---|---|
| 2002/0052916 A1 | 5/2002 | Kloba et al. |
| 2002/0083157 A1* | 6/2002 | Sekiguchi et al. ............ 709/219 |
| 2002/0152245 A1* | 10/2002 | McCaskey et al. ........... 707/530 |
| 2002/0161796 A1* | 10/2002 | Sylthe ......................... 707/500 |
| 2003/0046318 A1* | 3/2003 | Schohn et al. ............... 707/513 |
| 2003/0088829 A1 | 5/2003 | Itani |
| 2003/0106022 A1 | 6/2003 | Goodacre et al. |
| 2003/0130837 A1* | 7/2003 | Batchilo et al. ................. 704/9 |
| 2003/0135538 A1* | 7/2003 | Takeuchi et al. ............. 709/200 |
| 2003/0145279 A1* | 7/2003 | Bourbakis et al. ........... 715/511 |
| 2003/0167448 A1* | 9/2003 | Williamson et al. ......... 715/517 |
| 2003/0229854 A1* | 12/2003 | Lemay ........................ 715/513 |
| 2003/0232618 A1* | 12/2003 | Le et al. .................... 455/412.2 |
| 2004/0073872 A1* | 4/2004 | Yalovsky et al. ............. 715/517 |
| 2005/0262141 A1* | 11/2005 | Miyamori ................. 707/104.1 |
| 2006/0253463 A1* | 11/2006 | Wu et al. ....................... 707/10 |

FOREIGN PATENT DOCUMENTS

| | | |
|---|---|---|
| GB | 2 364 802 A | 2/2002 |
| WO | 01/057611 A2 | 8/2001 |
| WO | 02/33584 A1 | 4/2002 |
| WO | 02/077855 A1 | 10/2002 |

* cited by examiner

METHODS AND APPARATUS FOR SUMMARIZING DOCUMENT CONTENT FOR MOBILE COMMUNICATION DEVICES

CROSS-REFERENCE TO RELATED APPLICATION

This application claims priority to U.S. Provisional Patent Application No. 60/422,760 filed on Oct. 31, 2002.

BACKGROUND

1. Field of the Invention

The present invention relates generally to the generation of summary information for electronic documents for receipt and processing by mobile communication devices.

2. Description of the Related Art

Electronic documents are produced using various computer programs, such as word processors, spreadsheet programs, financial software, and presentation software. In addition to text, documents can contain "rich" content such as font information, embedded images, illustrations, bookmarks and hyperlinks. These electronic documents can be organized into groups of structural elements such as pages, worksheets or slides. When a user of a mobile communication device wishes to access an electronic document which resides on a remote computer and view the document on the mobile communication device, the entire electronic document is typically transmitted over a potentially bandwidth-constrained wireless network to the mobile communication device. For example, if a user wishes to view only the one-page terms and conditions section at the beginning of a 400-page document, the entire document is typically transmitted to the mobile communication device, of which the user only views one page on the mobile communication device.

The electronic document is viewed using the mobile communication device's user interface, which typically differs from the user interface used to create and view the document on a PC. While the user interface on a PC used to create an electronic document may include a large color display and a pointing device such as a mouse, the mobile device may have a small, non-color screen, and may not have a mouse. In addition, the mobile device typically has greater processing power and memory limitations than a PC used to view the electronic document, which may be very large in size.

SUMMARY

A document summary which includes an assemblage of a plurality of summary entries is generated for an electronic document. In the generation of the document summary, a content structure or properties within the electronic document are analyzed. The plurality of summary entries are selected from the contents of the electronic document based on the analysis of the content structure or properties. The content structure within the electronic document may include a table of contents, a plurality of spreadsheet worksheets, a plurality of document pages, etc. The content properties within the electronic document may include text formatting, paragraph formatting, paragraph sizing, etc. Preferably, the best available content structure or properties within the electronic document is identified and utilized in the selection of the plurality of summary entries. The document summary is provided to a mobile communication device in response to a request for the electronic document.

BRIEF DESCRIPTION OF THE DRAWINGS

Embodiments of present invention will now be described by way of example with reference to attached figures, wherein.

DETAILED DESCRIPTION OF THE PREFERRED EMBODIMENTS

A document summary which includes an assemblage of a plurality of summary entries is generated for an electronic document. In the generation of the document summary, a content structure or properties within the electronic document are analyzed. The plurality of summary entries are selected from the contents of the electronic document based on the analysis of the content structure or properties. The content structure within the electronic document may include a table of contents, a plurality of spreadsheet worksheets, a plurality of document pages, etc. The content properties within the electronic document may include text formatting, paragraph formatting, paragraph sizing, etc. Preferably, the best available content structure or properties within the electronic document is identified and utilized in the selection of the plurality of summary entries. The document summary is provided to a mobile communication device in response to a request for the electronic document.

Figure 1:
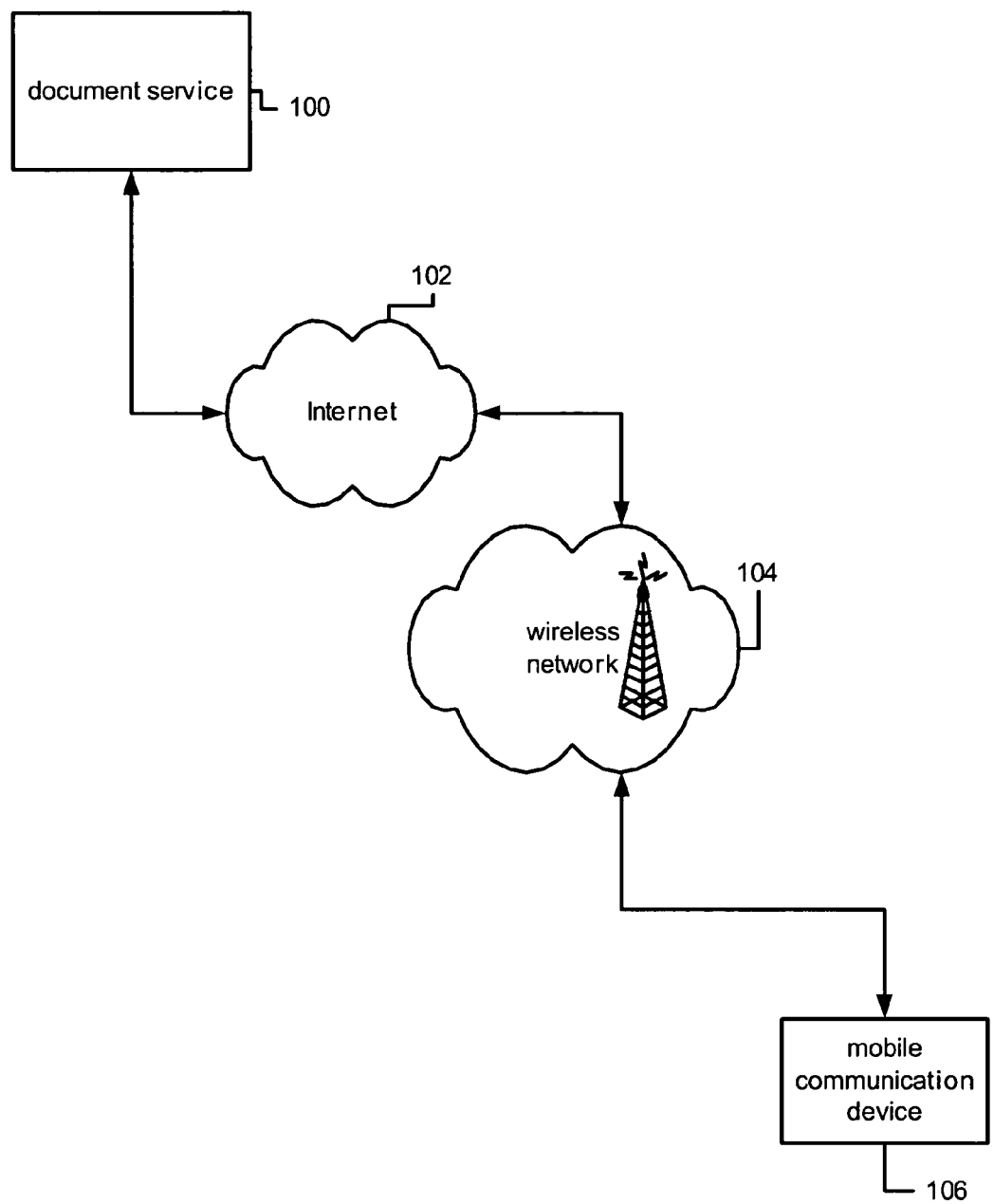
FIG. 1 is a block diagram of a data processing system in which a system of summarizing document content may be implemented.

FIG. 1 is a block diagram of a data processing system in which a system of summarizing document content may be implemented. The system includes a document service 100, which communicates with a mobile communication device 106 via the Internet 102 and a wireless network 104.

Figure 2:
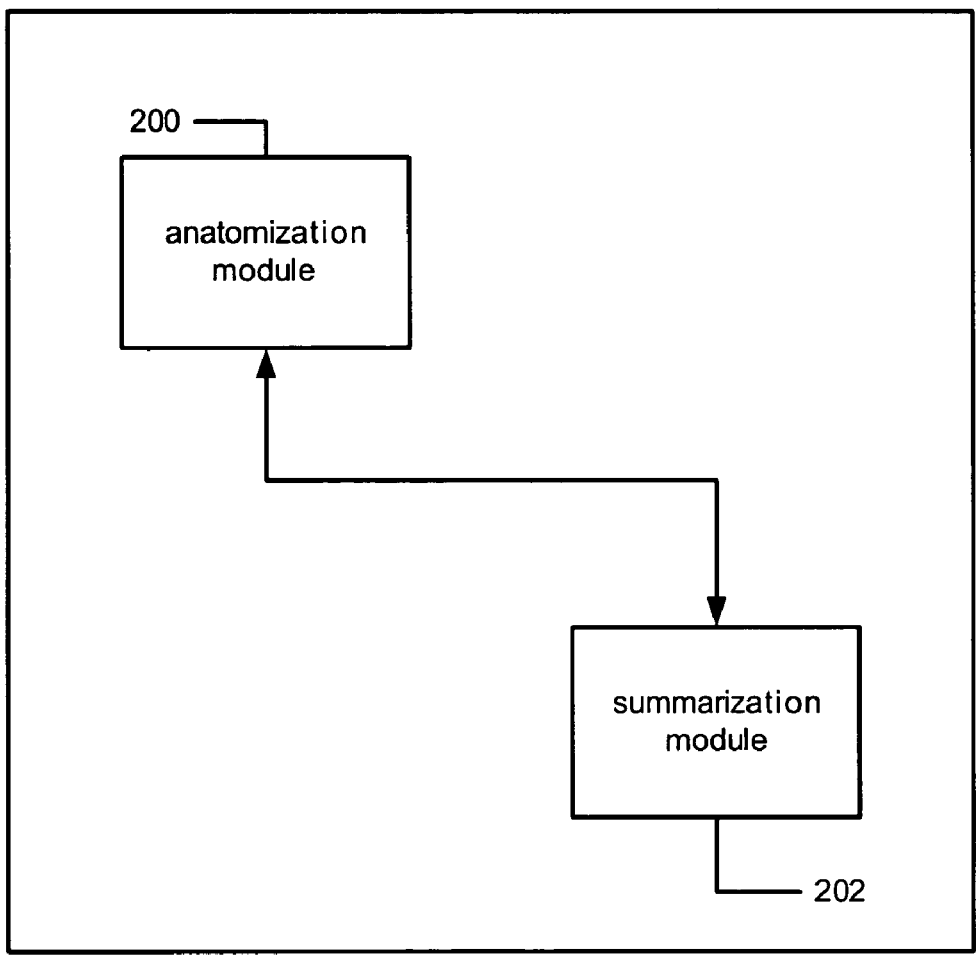
FIG. 2 is a block diagram of a document service.

The document service 100, which is further described in FIG. 2, processes and organizes content from electronic documents so that it can be transmitted to a client which requests the content. The electronic documents may be located in the document service, or they may be retrieved from a remote computer or service (not shown). The document service 100 processes electronic documents of a variety of different formats. For example, a document may use a format recognized by a specific word processing computer program, it may use a standard format for graphically storing text and images, or it may be a file containing only unformatted text. The organization performed by the document service 100 allows for efficient transmittal of content from the documents when the content is requested by a client.

The mobile communication device 106 is a client which requests content from the document service 100. The mobile communication device 106 includes a user interface (not shown). The user interface comprises one or more input devices, such as a keyboard and a trackwheel, and an output device, such as a computer screen. A user uses the mobile communication device's 106 input device to initiate the request for document content from the document service 100. Once document content has been transmitted to the mobile communication device 106 from the document service 100 via the Internet 102 and the wireless network 104, the content is displayed on the mobile communication device's 106 output device.

FIG. 2 is a block diagram of a document service. The document service includes an anatomization module 200 and a summarization module 202. The anatomization module 200 processes electronic documents, and creates a common document content data model, known as a Document Object Model (DOM). A DOM is a uniform representation of the content of an electronic document, which is independent of the original format of the document. Content from an electronic document is organized hierarchically in a DOM, which allows for extraction of a particular parts of a document. A DOM stores content such as text, formatting information, images and embedded objects from an electronic document, as well as organizational aids such tables of contents, hyperlinks, bookmarks, headers, footers, and page numbers. The summarization module 202 summarizes the contents of an electronic document, and produces a summary as a result. The summary is produced by iterating through the document hierarchy stored in the DOM. The summary organizes the content of an electronic document into a group of named entries that correspond to the sections of the electronic document. The entry names can then be used to retrieve content from the corresponding section of the electronic document. A system of summarizing document content is illustrated in FIG. 3.

Referring to FIGS. 1 and 2, when the document service 100 receives a request from a client, such as a mobile communication device 106, for content from an electronic document, the anatomization module 200 processes the electronic document, and creates a DOM associated with the electronic document. The summarization module 202 then creates a summary based on the DOM associated with the electronic document. The summary is then transmitted to the mobile communication device 106. The summary entries are presented to the user of the mobile communication device 106, who may then select one of the entries, thus requesting from the document service 100 the content which corresponds to the entry. In response, the document service 100 transmits the content corresponding to the entry name to the mobile communication device 106.

Using the summary generated by the summarization module 202, thereby allowing a client to request sections of an electronic document, precludes the need to send the entire electronic document to the mobile communication device 106. This minimizes the amount of network bandwidth consumed, as well as the time required to transmit the content of the electronic document. The amount of memory and processor time required to display the content on the mobile communication device 106 is also minimized. Use of the summary on the mobile communication device 106 facilitates navigation in an electronic document. Rather than traversing the potentially large electronic document in search of a particular section, the section is selected from the summary. This is especially useful for viewing electronic documents on a mobile communication device 106, since it typically has limited input devices, such as a trackwheel, which make navigation through large documents time-consuming.

Figure 3:
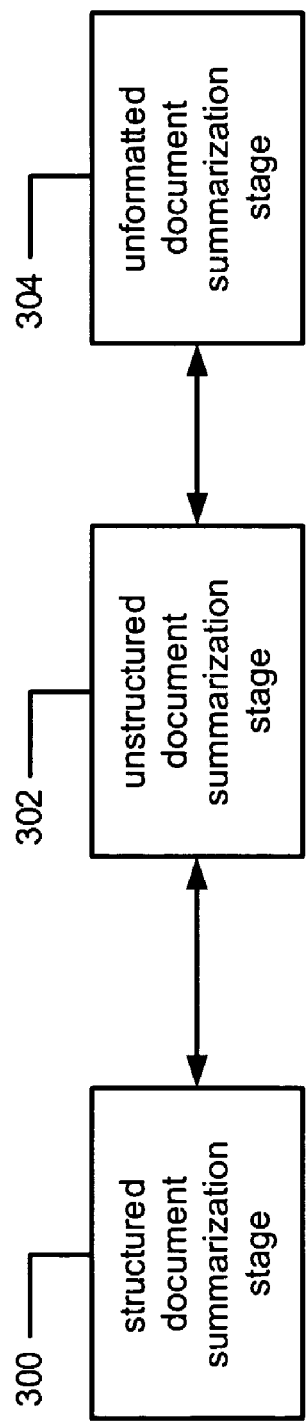
FIG. 3 is a block diagram of a system of summarizing document content.

FIG. 3 is a block diagram of a system of summarizing document content. The system includes a structured document summarization stage 300, an unstructured document summarization stage 302, and an unformatted document summarization stage 304. A DOM based on an electronic document is provided as input to the system. The output of the system is a summary for the electronic document.

The structured document summarization stage 300 establishes whether the inputted electronic document has a structure that can be used as a summary. The DOM is traversed to determine whether the document has a page, slide, worksheet or other structure. The stage also determines whether there are descriptive names associated with the structure elements, such as page names, slide titles or worksheet names.

The structured document summarization stage 300 also determines whether the electronic document contains a table of contents. A table of contents may have been generated by the computer software which was used to produce the electronic document. A table of contents is used by the structured document summarization stage 300 to generate the outputted summary. The structured document summarization stage 300 generates a summary from a table of contents using the entries in the table of contents. Each table of contents entry is comprised of a name, and a link to a location in the electronic document. The link has a corresponding bookmark, which specifies the paragraph referred to by the link in the table of contents entry. The summary entry names are copied from table of contents entry names, while the sections of the electronic document corresponding to the summary entries are the paragraphs referred to by the bookmarks associated with the table of contents entries.

Tables of contents in electronic documents are hierarchical, and may contain different levels of entries. The entries in the top level of a table of contents correspond to the broadest sections of the document, while entries at lower levels correspond to sub-sections of entries at higher levels. The structured document summarization stage 300 determines the level of a table of contents entry by examining the level of indentation of the paragraph referred to by the entry. Entries whose corresponding paragraphs are indented equally are at the same level in the table of contents. No indentation indicates a top-level entry, while greater indentation indicates a lower level entry. When a client first requests content from an electronic document containing a table of contents, the system of summarizing document content returns summary entries based on the top-level entries of the table of contents.

For an electronic document that is structured, but does not have a table of contents, the structured document summarization stage 300 generates a summary based on an alternate structure. For spreadsheet documents, where the structure elements are worksheets, the summary contains one entry for each worksheet in the spreadsheet document. If there are descriptive names associated with the worksheets in the document, then the descriptive names are used as the summary entry names. If there are no descriptive names, then the names for the summary entries are generated based on the position of the worksheet in the document. For example, the generated entry names may be "Sheet 1", "Sheet 2", "Sheet 3", and so on.

For electronic documents where the structure elements are pages, such as some word processing and Portable Document Format (PDF) documents, the summary contains entries which correspond to contiguous ranges of pages in the electronic document, starting with the first page. The ranges are calculated using a configurable value which specifies the maximum number of entries in the summary, and a value representing the total number of pages in the electronic document. Each summary entry, with the exception of the last summary entry, corresponds to a range of pages having a number of pages equal to the total number of pages, divided by the maximum number of entries, rounded up. The last entry corresponds to the range of pages which does not yet correspond to a summary entry, and which may contain fewer pages than ranges corresponding to the previous summary entries. The names of the summary entries describe the page ranges to which the summary entries correspond. For example, if an electronic document has ten pages, and the configurable maximum number of entries in the summary is three, then the summary entries may be "Page 1 to Page 4", "Page 5 to Page 8", and "Page 9 to Page 10".

The system of summarizing document content also includes the unstructured document summarization stage 302, which summarizes electronic documents which are not structured, as determined by the structured document summarization stage 300. The unstructured document summarization stage 302 operates on the assumption that the majority of text in an electronic document is formatted in the same way, while titles and headers are formatted differently than the majority of text in the electronic document. For example, titles may be bold and have a greater font size than the rest of the text in an electronic document. The formatting of the electronic document is analyzed in order to determine textual elements in the electronic document which are section identifiers, such as headers and titles. A summary is then generated, using section identifiers as entry names. The document section which corresponds to a summary entry using a section identifier as its name is the section of the electronic document that contains the section identifier.

The unstructured document summarization stage 302 examines changes in the formatting of text in the electronic document. Formatting that is examined includes font properties including font name, size, weight, and style, such as italic and underline font styles. Formatting that is examined also includes paragraph styles such as left or right alignment, and indentation. Changes in these format properties indicate potential section identifiers in the electronic document. For example, if a document contains text that has a font size of 12, except for paragraphs which have a font size of 14 and which are bolded, then the paragraphs with the larger font are potential section identifiers.

In order to determine which paragraphs in an electronic document are section identifiers to be included in the summary, the unstructured document summarization stage 302 traverses the DOM associated with the electronic document to collect font and paragraph properties, and text from the electronic document. The collected information is then analyzed in order to generate a summary for the electronic document.

The unstructured document summarization stage 302 traverses the DOM, examining the paragraphs in the electronic document. Paragraph information for each paragraph is collected. The information collected for each paragraph includes the number of characters in the paragraph, the font properties of the first font used in the paragraph, the text segment which is formatted using the first font in the paragraph, a flag indicating whether all the text in the paragraph is formatted with the same font, the paragraph alignment, which is left, center, right or justified, and the level of indentation of the first line of text in the paragraph.

The unstructured document summarization stage 302 also traverses the DOM in order to examine each character in the electronic document, and the font properties associated with each character. Each font and the number of characters in the electronic document which are formatted with the font are collected. The collected font information is used to determine which fonts are valid section identifier fonts. Using the assumption that the majority of paragraphs in an electronic document are formatted in the same way and are not section identifiers, fonts that are used extensively throughout the electronic document are not valid section identifier fonts and are discarded. An invalid section identifier font has a ratio of number of characters formatted with the font to total number of characters in the electronic document that is higher than a configurable threshold. Paragraphs that are not formatted with a valid section identifier font are not considered to be section identifiers, and the collected information corresponding to the paragraphs are discarded.

The paragraph information is further filtered to discard paragraphs that are not of an appropriate size to be used as summary entries. Paragraph information for paragraphs that contain no characters that are not spaces are discarded. The paragraph information is further filtered to discard document title paragraphs. Document title paragraphs appear at the beginning of an electronic document, and are formatted with a combination of font and paragraph properties that is unique in the electronic document.

The unstructured document summarization stage 302 organizes the paragraph information into groups of information for paragraphs that begin with text that is formatted with the same font and paragraph properties. Each paragraph information group comprises formatting information, including font and paragraph properties, and text from paragraphs which is formatted with the font and paragraph properties. The paragraph information groups are ordered according to the formatting properties in the groups. The formatting properties that are considered are those with which section identifiers are most likely to be formatted. The groups are first ordered according to paragraph font size. Paragraph information groups whose font size property specifies greater font size have higher orders. The groups that are equivalent according to the preceding criterion are further ordered according to paragraph alignment. Paragraph information groups whose paragraph alignment property specifies centered text have higher orders. Equivalent groups are further ordered according to whether all the characters in the paragraphs are formatted with an identical font. Paragraph information groups which specify that all the characters in the paragraphs are formatted with an identical font have higher orders. Equivalent groups are further ordered according to level of indentation. Paragraph information groups whose paragraph indentation property specifies greater indentation have higher orders. Equivalent groups are further ordered according to font weight. Paragraph information groups whose font weight property specifies bold text have higher orders. Equivalent groups are further ordered according to font style, including italic and underlined text. Paragraph information groups whose font style properties specify italic and underlined text have higher orders. Finally, groups that are equivalent according to the preceding criteria are further ordered according to font name. Paragraph information groups whose font name property specifies a font name for a font with which fewer characters in the electronic document are formatted have higher orders.

Thus, the paragraph information groups are ordered such that text from the paragraphs that are most likely to be section identifiers is contained in the groups of the highest orders, while text from the paragraphs that are least likely to be section identifiers is contained in the groups of the lowest orders. Paragraph information groups which contain text from only one paragraph are discarded, unless information for only one paragraph has been collected.

The summary for the electronic document is generated using the paragraph information group that has the highest order. Entries for paragraphs are added to the summary according to the order of the paragraph information in the paragraph information group. For each paragraph for which paragraph information is contained in the group, the text segment formatted with the first font in the paragraph is deemed to be a section identifier and is included as an entry name in the summary. The section of the electronic document corresponding to the summary entry is the section of the document which contains the section identifier. Alternatively, the summary may be generated using paragraph information from multiple paragraph information groups.

The system of summarizing document content also includes an unformatted document summarization stage 304 which generates summaries for electronic documents which contain no text formatting information, or in which all the text is formatted identically, as determined by the unstructured document summarization stage 302. The unformatted document summarization stage 304 examines paragraph sizes and paragraph text patterns to determine which paragraphs are most likely to be section identifiers. For example, shorter paragraphs are more likely to be section identifiers than longer paragraphs. In order to determine which paragraphs in an unformatted electronic document are section identifiers to be included in the summary, the unformatted document summarization stage 304 traverses the DOM associated with the electronic document to collect paragraph information and text from the electronic document. The collected information is then analyzed in order to generate a summary for the electronic document.

The unformatted document summarization stage 304 traverses the DOM, examining the paragraphs in the electronic document. Paragraph information for each paragraph is collected. The information collected for each paragraph includes the number of characters in the paragraph and the text contained in the paragraph. The paragraph information is filtered to discard paragraphs that are not of an appropriate size to be used as summary entries. Paragraph information for paragraphs that contain no characters that are not spaces are discarded. The unformatted document summarization stage 304 organizes the paragraph information into groups of information for paragraphs that have the same number of characters. Each paragraph information group comprises a paragraph size and text from the paragraphs in the electronic document that contain a number of characters equal to the paragraph size. The paragraph information groups are ordered into an ascending order according to the paragraph sizes, where the paragraph information groups that specify smaller paragraph sizes have higher orders. The paragraph information groups are thus ordered such that text from the paragraphs that are most likely to be section identifiers is contained in the groups of the highest orders, while text from the paragraphs that are least likely to be section identifiers is contained in the groups of the lowest orders.

Since paragraph size is a key criterion in determining which paragraphs in an unformatted electronic document are most likely to be section identifiers, if there is not sufficient variance in the size of the paragraphs in the document, then the document is determined to be unsummarizable by the unformatted document summarization stage 304. Unsummarizable documents are those for which the ratio of the size of the largest paragraph to the size of the smallest paragraph is not greater than a configured minimum threshold. For example, the threshold may be 2:1, so that an unsummarizable electronic document is one for which the largest paragraph is not twice as large as the smallest paragraph. Unsummarizable documents may be movie transcripts or raw test data, for example.

The summary for an unformatted electronic document which is determined to be summarizable is generated from the paragraphs for which paragraph information is collected. The paragraph information is examined to determine whether the unformatted electronic document contains a list. If a majority of the text contents of the paragraphs start with a text pattern which indicates a list element, then the document contents is determined to be a list. For example, the text pattern may be ascending numbers, such that a paragraph starts with a "1", a subsequent paragraph starts with a "2", a subsequent paragraph starts with a "3", and so on. List elements may also begin with letters or Roman numerals.

For an unformatted electronic document that is determined to be a list, the text contents of the paragraphs that are list elements are deemed to be section identifiers and are included as entry names in the summary. For an unformatted electronic document that is determined not to be a list, the text contents of the paragraphs that do not start with list text patterns are deemed to be section identifiers and are included as entry names in the summary. Entries for paragraphs are added to the summary according to the order of the paragraph information in the paragraph information groups. The section of the electronic document corresponding to each summary entry is the section of the document which contains the summary entry name. The system of summarizing document content may identify other information in an electronic document as potential section identifiers. Such information includes bookmarks, meta-tags, formatted text in proximity to a formula in a spreadsheet document, graph labels and legends. In addition to section identifiers, the summary outputted by the system of summarizing document content may contain entries for other elements of navigational significance, such as images and embedded objects. An example of an embedded object is a spreadsheet embedded in a word-processing document.

The system of summarizing document content may also include a summary database (not shown) which can be used to improve the accuracy of the unstructured document summarization stage 302 and the unformatted document summarization stage 304. When an unstructured electronic document is provided to the system of summarizing document content, a summary is generated, or the document is determined to be unsummarizable, as described above. The summary database then records the result of the summarization and records the formatting properties, including font and paragraph properties, which are used for section identifiers and other paragraphs in the unformatted electronic document. The relationships of formatting information to section identifiers contained in the summary database can be used by a heuristically learning process for summarizing documents which improves with each additional electronic document that is summarized.

Figure 4:
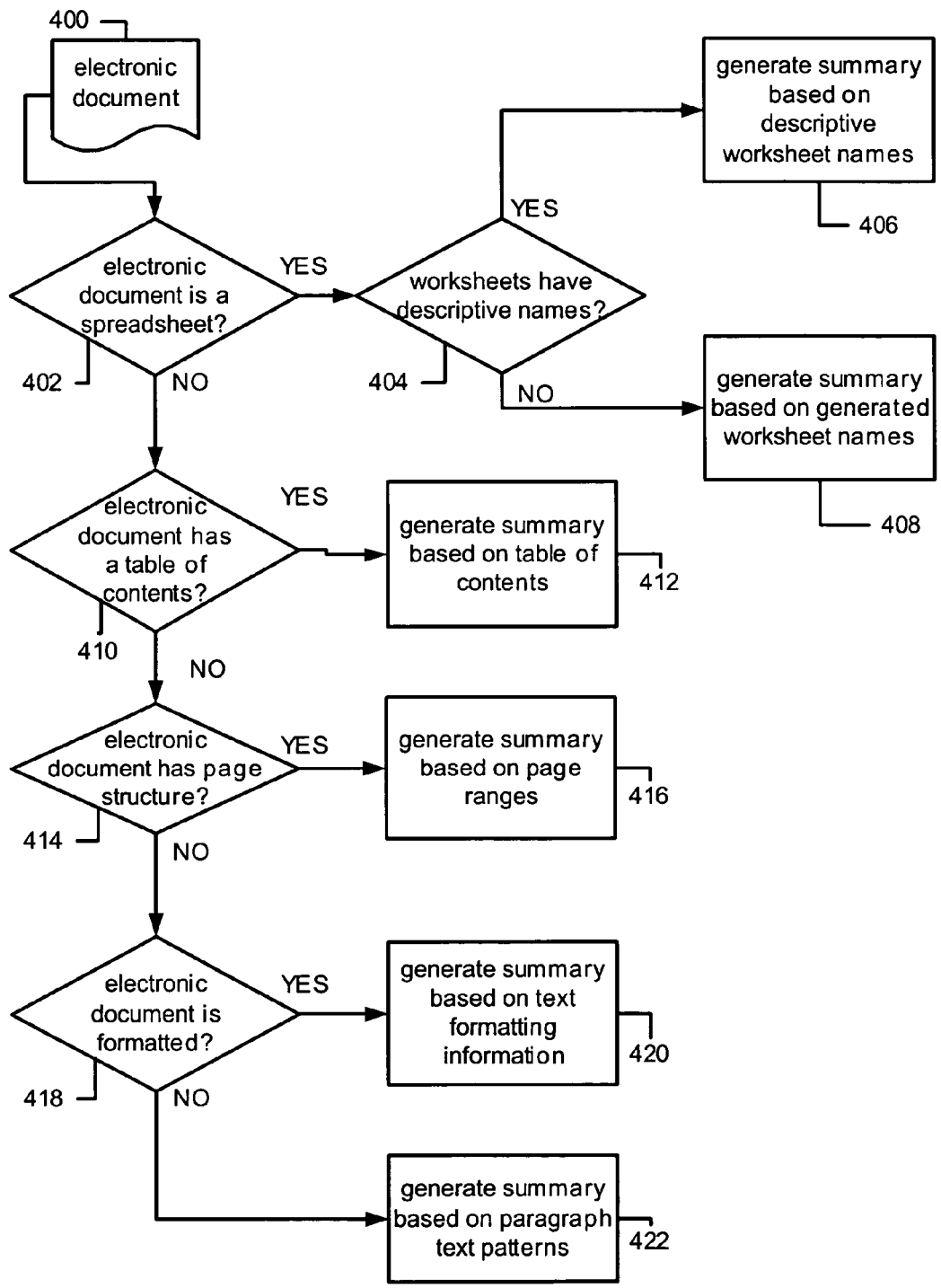
FIG. 4 is a flowchart illustrating a method of summarizing document content.

FIG. 4 is a flowchart illustrating a method of summarizing document content. The method generates a summary of an electronic document 400 which is represented by a Document Object Model (DOM). The method begins with the step 402 of determining whether the electronic document 400 is a spreadsheet. Spreadsheets contain data presented in rows and columns, and are comprised of one or more worksheets. If it is determined at step 402 that the electronic document 400 is a spreadsheet, then the method continues at step 404. Otherwise, the method continues at step 410. A spreadsheet may also contain descriptive names that are associated with the worksheets in the spreadsheet. If it is determined at step 404 that the spreadsheet contains descriptive names associated with the worksheets, then the method continues at step 406. Otherwise, the method continues at step 408. At step 406, a summary of the electronic document 400 is generated based on the descriptive worksheet names. The summary entry names are copied from the worksheet descriptive names, and the document sections corresponding to the summary entries are the worksheets. At step 408, a summary of the electronic document 400 is generated based on names which are generated for the worksheets. The worksheet names are generated based in the position of the worksheets in the electronic document 400. For example, if there are three worksheets, then the worksheet names may be "Sheet 1", "Sheet 2" and "Sheet 3". The document sections corresponding to the summary entries are the worksheets.

Step 410 determines whether the DOM, and thus the electronic document 400, contains a table of contents. If it is determined that the electronic document 400 does contain a table of contents, then a summary based on the table of contents is generated at step 412. The names of the entries in the summary are copied from the contents of the paragraphs which have bookmarks corresponding to the links defined in entries in the table of contents. The document sections corresponding to the summary entries are the paragraphs referred to by the entries in the table of contents. If it is determined at step 410 that the electronic document does not contain a table of contents, then the method continues at step 414.

Step 414 determines whether the electronic document 400 has a page structure. The method continues at step 416 if the electronic document 400 has a page structure. A summary is generated at step 416 based on contiguous ranges of pages in the electronic 400 document, starting with the first page. Each entry in the summary corresponds to a range of pages in the document, and has a name which describes the range of pages. The calculation of the page ranges is based on a configurable maximum number of entries in the summary, and on the number of pages in the electronic document 400. Except for the range corresponding to the last summary entry, the number of pages in each range is the number of pages in the document, divided by the maximum number of entries in the summary, rounding up. The number of entries in the range corresponding to the last summary entry is the total number of pages in the document, less the sum of the number of pages in the other ranges. If it is determined at step 414 that the electronic document 400 does not have a page structure, then the method continues at step 418.

Figure 5:
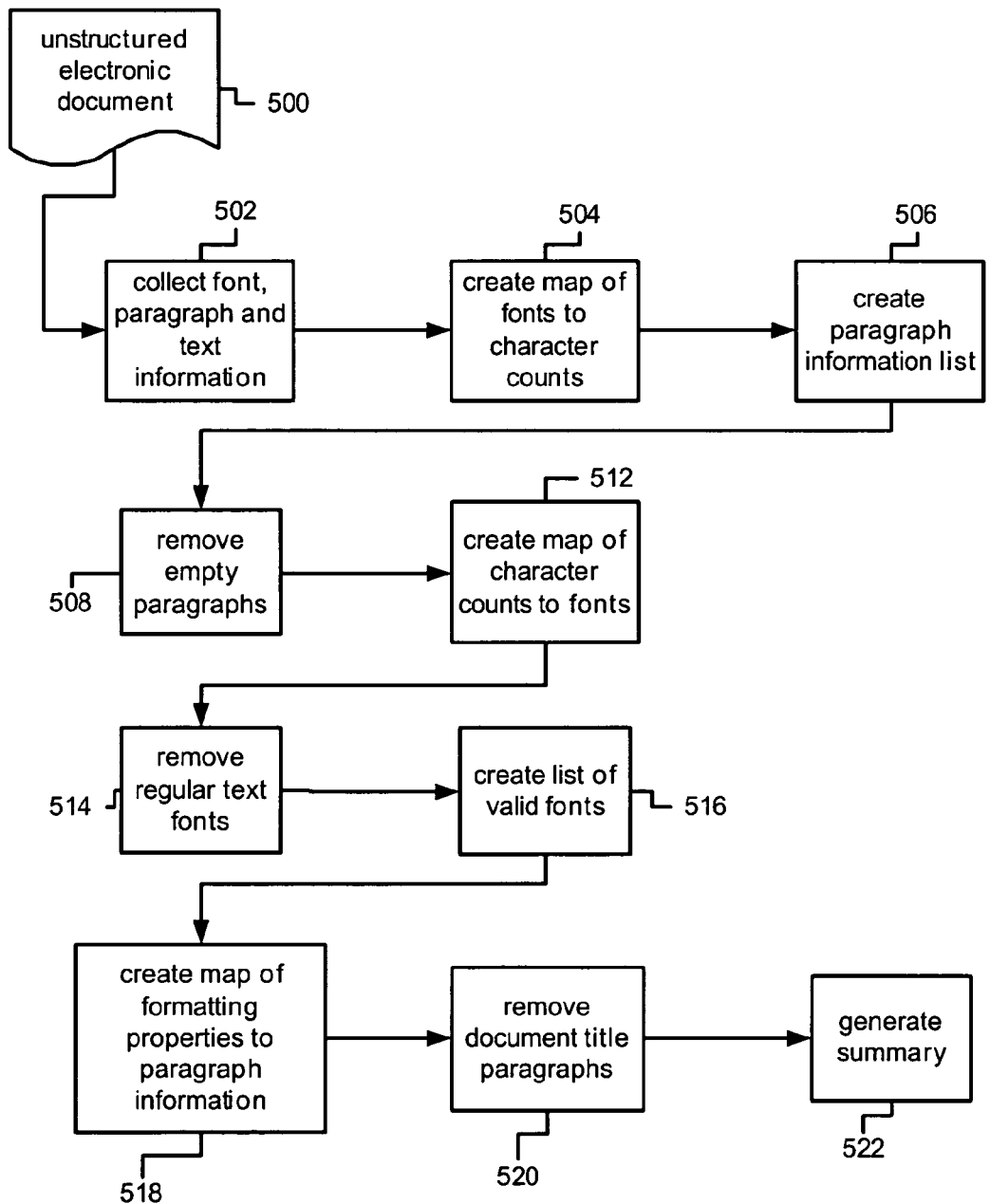
FIG. 5 is a flowchart illustrating a method of summarizing an unstructured electronic document.
Figure 6:
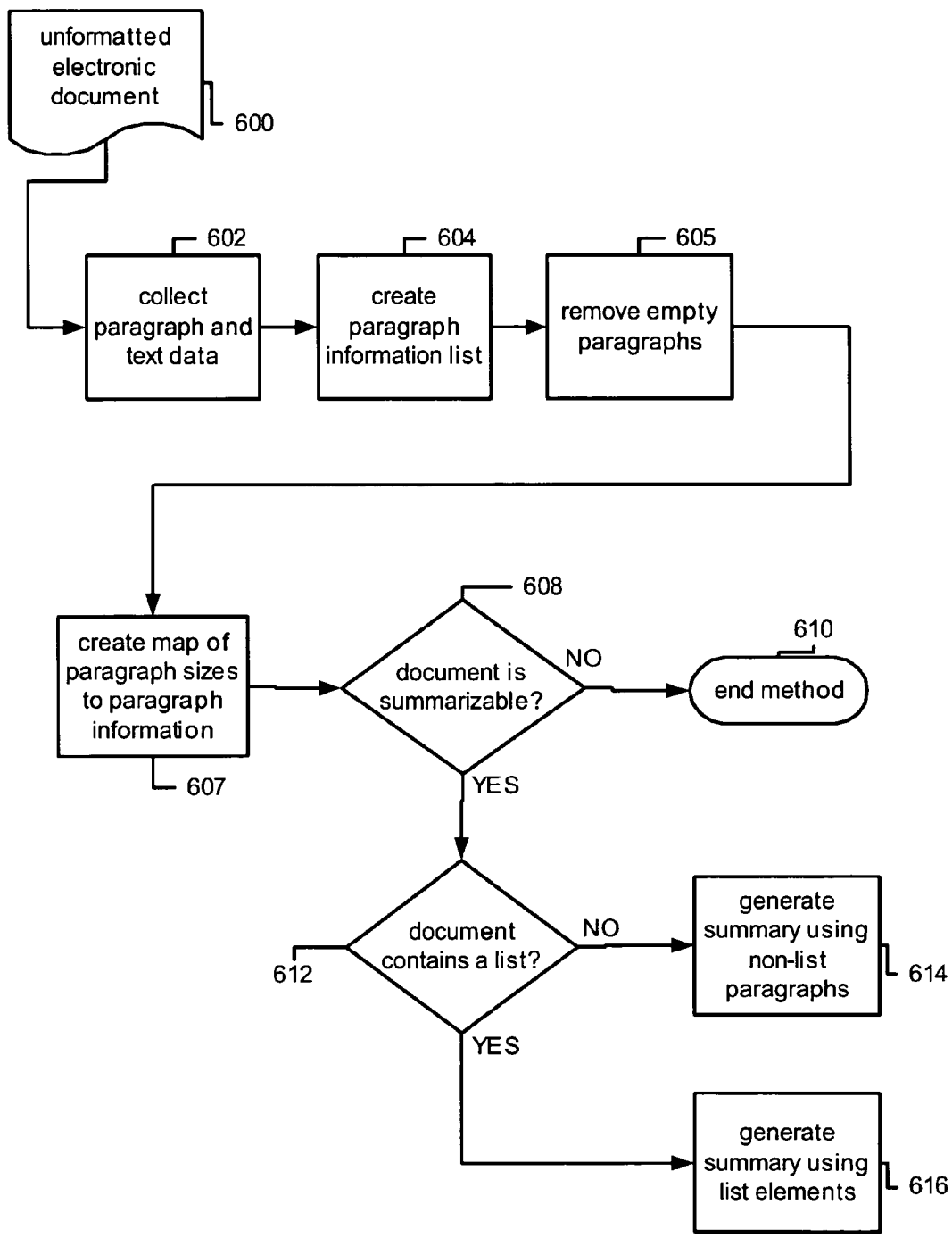
FIG. 6 is a flowchart illustrating a method of summarizing an unformatted electronic document.

Step 418 determines whether the electronic document 400 contains text formatting information. Text formatting information includes font types, font styles, and font sizes. If the electronic document does not contain text formatting information, or if all the text in the electronic document 400 is formatted identically, then the document determined to be unformatted, and the method continues at step 422. Otherwise, the method continues at step 420. At step 420, a summary for the electronic document 400 is generated based on text formatting information. The summary entries are determined by examining changes in the text formatting information. A method of summarizing an unstructured electronic document using text formatting information is illustrated in FIG. 5. At step 422, a summary for the electronic document 400 is generated based on paragraph text patterns. The summary entries are determined by examining paragraph sizes and paragraph text patterns. A method of summarizing an unformatted electronic document using paragraph text patterns is illustrated in FIG. 6.

FIG. 5 is a flowchart illustrating a method of summarizing an unstructured electronic document using text formatting information. The method generates a summary of an unstructured electronic document 500 which is represented by a DOM. The method begins with the step 502 of traversing the DOM to collecting font, paragraph formatting and text information. For each paragraph in the unstructured electronic document 500, the information collected includes paragraph alignment, paragraph indentation, the total number of characters in the paragraph, font properties for the first font used to format text in the paragraph, and the text segment formatted with the first font. The font properties includes the font name, font size, font weight, and font style such as italic or underlined text.

The method continues with the step 504 of creating a map of font properties to character counts. For each different combination of font properties collected in step 502, the map of font properties to character counts contains an entry which maps the combination of font properties to a count equal to the number of characters in the unstructured electronic document 500 which are formatted with the properties. The method continues with the step 506 of creating a list of paragraph information. For each paragraph in the unstructured electronic document 500, the paragraph information list contains an entry which includes the font, paragraph formatting and text information for the paragraph collected at step 502, and a flag which indicates whether size of the text segment formatted with the first font is equal to the size of the paragraph, thus indicating that all the characters in the paragraph are formatted with the same font. The method continues with the step 508 of removing paragraph information for empty paragraphs from the paragraph information list. Empty paragraphs contain no non-space characters. The method continues with the step 512 of creating a map of character counts to fonts. The map records the number of characters that are formatted with each font used in the unstructured electronic document 500, and is created based on the map of font properties to character counts created in step 504. At step 514, fonts that are used extensively in the unstructured electronic document 500, and thus are considered to be regular fonts that format text which is not a valid summary entry, are removed from the map of character counts to fonts. A font is determined to be a regular font if the ratio of characters formatted with the font to the number of characters in the document is higher than a configurable threshold.

The method continues with the step 516 of creating a list of valid fonts. Valid fonts are those which those which remain in the map of character counts to fonts after step 514, since, for each valid font, the ratio of characters formatted with the valid font to the number of characters in the document is lower than the configurable threshold. Paragraphs which are not formatted with valid fonts are not included in the generated summary. The method continues with the step 518 of creating a map of formatting properties to paragraph information. The map is created using the map of character counts to fonts created at step 512, the valid font list created at step 516, and the paragraph information list created at step 506. The keys in the map of formatting properties to paragraph information map contain formatting properties that are used to determine how likely the paragraphs are to be included in the generated summary. The formatting properties include whether all the characters in a paragraph are formatted with the same font, paragraph alignment, paragraph indentation, font name, font size, font weight, which indicates whether text is bolded, and font style, which indicates whether text is italic or underlined. For each key, the values mapped to it are entries from the paragraph information list corresponding to paragraphs in the unformatted electronic document 500 which are formatted with the formatting properties contained in the key.

The map of formatting properties to paragraph information is created by iterating through the entries in the paragraph information list. For each paragraph information entry in the list, if the first text font specified is not in the list of valid fonts, then the paragraph information entry is removed from the list. If the first text font specified is in the list of valid fonts, then a key is constructed from the paragraph information. If the key is not already in the map of formatting properties to paragraph information, then it is added. The paragraph information is then added to the values mapped to the key in the map. The map of formatting properties to paragraph information is ordered such that paragraph information for paragraphs that are most likely to be included in the generated summary are placed first in the map, while paragraph information for paragraphs that are least likely to be included in the generated summary are placed last in the map. The keys are added to the map such that the order is preserved.

Given two keys in the map of formatting properties to paragraph information, the order of the first key in relation to the order of the second key is determined by comparing the formatting information contained in the keys. If the first key's font size property specifies a greater size than the second key's font size property, then the first key is ordered before the second key. If the second key's font size property specifies a greater font size than the first key's font size property, then the second key is ordered before the first key. Otherwise, if the first key's paragraph alignment property specifies centered text, and the second key's does not, then the first key is ordered before the second key. If the second key's paragraph alignment property specifies centered text, and the first key's does not, then the second key is ordered before the first key. Otherwise, if the first key specifies that all the characters in a paragraph are formatted with an identical font, and the second key does not, then the first key is ordered before the second key. If the second key specifies that all the characters in a paragraph are formatted with an identical font, and the first key does not, then the second key is ordered before the first key. Otherwise, if the first key's paragraph indentation property specifies a greater indentation than the second key's indentation property, then the first key is ordered before the second key. If the second key's paragraph indentation property specifies a greater indentation than the first key's indentation property, then the second key is ordered before the first key. Otherwise, if the first key's font weight property specifies bold text and the second key's does not, then the first key is ordered before the second key. If the second key's font weight property specifies bold text and the first key's does not, then the second key is ordered before the first key. Otherwise, if the first key specifies italic font style, and the second key does not, then the first key is ordered before the second key. If the second key specifies italic font style, and the first key does not, then the second key is ordered before the first key. Otherwise, if the first key specifies underlined font style, and the second key does not, then the first key is ordered before the second key. If the second key specifies underlined font style, and the first key does not, then the second key is ordered before the first key. Otherwise, if there are fewer characters in the unstructured electronic document that are formatted with the font specified by the font name in the first key than are formatted with the font specified by the font name in the second key, then the first key is ordered before the second key. If there are fewer characters in the unstructured electronic document that are formatted with the font specified by the font name in the second key than are formatted with the font specified by the font name in the first key, then the second key is ordered before the first key. Otherwise, the keys are considered to be equal, and the paragraphs for which corresponding information is mapped to by the keys are equally likely to be included in the generated summary.

The method continues with the step 520 of removing document title paragraphs, which appear at the beginning of an electronic document, and are formatted with a combination of font and paragraph properties that is unique in the electronic document. A key comprised of formatting information, as described above, is created for the first element of the paragraph information list, which corresponds to the first paragraph in the unstructured electronic document 500. If the key exists in the map of formatting properties to paragraph information, then information corresponding to contiguous paragraphs starting with the first paragraph in the unstructured electronic document 500 formatted with the properties contained in the key is removed from the map of formatting properties to paragraph information.

The method concludes with the step 522 of generating the summary. The summary is generated by iterating through the keys in the map of formatting properties to paragraph information, until a key is found for which there is more than one entry mapped. Summary entries are created for each paragraph for which information is mapped to by the key. For each such paragraph, the summary entry name is the text segment formatted with the first font in the paragraph. The section of the electronic document corresponding to each summary entry is the section of the document which contains the summary entry name. If no keys are mapped to paragraph information for multiple paragraphs, then the summary is generated from the paragraph information mapped to by the first key. Alternatively, the summary may be constructed using paragraph information which is mapped to by multiple keys in the map of formatting properties to paragraph information.

FIG. 6 is a flowchart illustrating a method of summarizing an unformatted electronic document. The method generates a summary of an unformatted electronic document 600 which is represented by a DOM. The method begins with the step 602 of traversing the DOM to collect paragraph and text data. For each paragraph in the unformatted electronic document 600, the information collected includes the total number of characters in the paragraph, and the text contents of the paragraph. The method continues with the step 604 of creating a paragraph information list. For each paragraph in the unformatted electronic document 600, the paragraph information list contains an entry which includes the information collected at step 602. The method continues with the step 605 of removing information for paragraphs which contain no non-space characters from the paragraph information list. The method continues with the step 607 of creating a map of paragraph sizes to paragraph information. The map of paragraph sizes to paragraph information is created by iterating through the paragraph information list, and mapping information for each paragraph to a key in the map which corresponds to the number of characters in the paragraph. The map is ordered such that information for shorter paragraphs appears first in the map, while information for longer paragraphs appears last in the map. At step 608, it is determined whether the unformatted electronic document 600 is summarizable. If the ratio of size of the largest paragraph to the smallest paragraph is greater than a configurable threshold, such as 2:1, then the document is summarizable and the method continues at step 612. Otherwise, the method ends at step 610.

At step 612, it is determined whether the unformatted electronic document 600 contains a list. This determination is made by iterating through the paragraph information list, and examining the text at the beginning of the paragraph text contents. If the majority of the text contents start with a pattern indicating a list, such as ascending numbers or letters, then the method continues at step 616. Otherwise, the method continues at step 614. At step 614, the summary is generated from the paragraph text contents from the paragraph information list which do not start with a list pattern, as described above. For each paragraph that does not start with a list pattern, a summary entry is created whose name is copied from the text contents of the paragraph. The section of the unformatted electronic document 600 which corresponds to the summary entry is the section containing the summary entry name. Entries for paragraphs are added to the summary according to the order of the paragraph information in the map of paragraph sizes to paragraph information. At step 616, the summary is generated from the paragraph text contents from the paragraph information list which start with a list pattern, as described above. For each paragraph that starts with a list pattern, a summary entry is created whose name is copied from the text contents of the paragraph. The section of the unformatted electronic document 600 which corresponds to the summary entry is the section containing the summary entry name. Entries for paragraphs are added to the summary according to the order of the paragraph information in the map of paragraph sizes to paragraph information. The method of summarizing document content may contain may contain fewer, additional, or differently ordered steps than shown in FIGS. 4-6.

The methods described herein may be performed by one or more servers in the network. A computer program product of the present application may include computer instructions stored on a computer storage medium (memory of the mobile device or one or more servers of the network, a floppy disk or CD-ROM) which are written in accordance with the described logic.

Final Comments. Methods and apparatus for summarizing document content for mobile communication devices have been described. One exemplary method includes the steps of analyzing a content structure or properties within an electronic document; generating document summary information which includes an assemblage of a plurality of summary entries selected from the contents of the electronic document based on the analysis of the content structure or properties; and providing the document summary information for a mobile communication device. The content structure within the electronic document may include a table of contents, a plurality of spreadsheet worksheets, a plurality of document pages, etc. The content properties within the electronic document may include text formatting, paragraph formatting, paragraph sizing, etc. Preferably, the best available content structure or properties within the electronic document is identified and utilized in the selection of the plurality of summary entries. In the preferred embodiment, the summary entries are selected based on content structure if it is available, followed by differences in text/paragraph formatting if available, and then followed by differences in paragraph sizing. An associated computer program product of the present application includes a computer storage medium; and computer program instructions stored on the computer storage medium which are executable on a processor for generating summary information for an electronic document by analyzing a content structure or properties within an electronic document; generating document summary information which includes an assemblage of a plurality of summary entries selected from the contents of the electronic document based on the analysis of the content structure or properties; and providing the document summary information for a mobile communication device.

A server for generating summary information for electronic documents includes one or more document summarization processes such as a structured document summarization process, a formatted document summarization process, and an unstructured/unformatted document summarization process. The structured document summarization process is configured to generate summary information by selecting a plurality of summary entries from an electronic document based on a predetermined content structure identified in the electronic document. The formatted document summarization process is configured to generate summary information by selecting a plurality of summary entries from an electronic document based on differences in content formatting identified in the electronic document. The unstructured/unformatted document summarization process is configured to generate summary information by selecting a plurality of summary entries from an electronic document based on differences in paragraph sizes in the electronic document.

A system which facilitates the communication of summary information for electronic documents to mobile communication devices includes a server, a wireless communication network, and a mobile communication device which operates in the wireless communication network. The server includes one or more document summarization processes such as a structured document summarization process, a formatted document summarization process, and an unstructured/unformatted document summarization process. The structured document summarization process is configured to generate summary information by selecting a plurality of summary entries from an electronic document based on a predetermined content structure identified in the electronic document. The formatted document summarization process is configured to generate summary information by selecting a plurality of summary entries from an electronic document based on differences in content formatting identified in the electronic document. The unstructured/unformatted document summarization process is configured to generate summary information by selecting a plurality of summary entries from an electronic document based on differences in paragraph sizes in the electronic document. The wireless communication network is configured to communicate the summary information to a mobile communication device in response to a request for the electronic document.

The above description relates to one example of the present invention. Many variations will be apparent to those knowledgeable in the field, and such variations are within the scope of the application. For example, although FIG. 1 shows an example in which a mobile communication device 106 communicates with a document service 100 via a wireless network 104 and the Internet 102, clients other than mobile communication devices 106 can request summaries for electronic documents from the document service 100, and may communicate with the document service 100 via different networks. The invention described herein in the recited claims intend to cover and embrace all suitable changes in technology.

The invention claimed is:

1. A computer implemented method of generating summary information for an electronic document for use by a mobile communication device, comprising:

receiving a request from a user of the mobile communication device for document summary information of the electronic document;

determining whether the electronic document is a structured document, an unstructured document or an unformatted document;

generating the document summary information which includes an assemblage of a plurality of summary entries selected from the contents of the electronic document based on the determining step, wherein the generating document summary information includes determining:

if the electronic document is a structured document by examining whether the electronic document contains content structure which includes a table of content, a plurality of spreadsheet worksheets, and/or a plurality of document pages, for the electronic document containing a table of content, selecting the plurality of summary entries from the electronic document based on top level entries of the table of content, for the electronic document containing a plurality of spreadsheet worksheets, selecting the plurality of summary entries from the electronic document containing one entry for each worksheet in the spreadsheet document, and for the electronic document containing a plurality of document pages, selecting the plurality of summary entries which correspond to contiguous ranges of pages in the electronic document;

if the electronic document is an unstructured document by examining changes in formatting of text in the electronic document, wherein the formatting of text includes font properties, paragraph alignment and indentation, and text properties, selecting the plurality of summary entries from the electronic document based on the examining changes in the formatting of text, and wherein the font properties includes font names, text font sizes, text font weights, and text font styles;

otherwise if the electronic document is an unformatted document by examining paragraph sizes and paragraph text patterns, selecting the plurality of summary entries from the electronic document based on the examining paragraph sizes and paragraph text patterns; and providing the document summary information for the mobile communication device.

2. The computer implemented method of claim 1, wherein the summary information is provided to the mobile communication device without the electronic document.

3. The computer implemented method of claim 1, wherein said selecting the plurality of summary entries from the electronic document based on differences in content properties comprises determining if the content properties include at least one of text formatting, paragraph alignments or indents and in response selecting the plurality of summary entries based on differences in said at least one of text formatting, paragraph alignments or indents; and otherwise selecting the plurality of summary entries based on differences in said paragraph sizes.

4. A computer program product, comprising:

a computer storage medium;

computer program instructions stored on the computer storage medium;

the computer program instructions being executable on a processor for generating document summary information for an electronic document by:

receiving a request from a user of a mobile communication device for the document summary information of the electronic document;

determining whether the electronic document is a structured document, an unstructured document or an unformatted document;

generating the document summary information which includes an assemblage of a plurality of summary entries selected from the contents of the electronic document based on the determining step, wherein the generating document summary information includes determining:

if the electronic document is a structured document by examining whether the electronic document contains content structure which includes a table of content, a plurality of spreadsheet worksheets, and/or a plurality of document pages, for the electronic document containing a table of content, selecting the plurality of summary entries from the electronic document based on top level entries of the table of content, for the electronic document containing a plurality of spreadsheet worksheets, selecting the plurality of summary entries from the electronic document containing one entry for each worksheet in the spreadsheet document, and for the electronic document containing a plurality of document pages, selecting the plurality of summary entries which correspond to contiguous ranges of pages in the electronic document;

if the electronic document is an unstructured document by examining changes in formatting of text in the electronic document, wherein the formatting of text includes font properties, paragraph alignment and indentation, and text properties, selecting the plurality of summary entries from the electronic document based on the examining changes in the formatting of text, and wherein the font properties includes font names, text font sizes, text font weights, and text font styles;

otherwise if the electronic document is an unformatted document by examining paragraph sizes and paragraph text patterns, selecting the plurality of summary entries from the electronic document based on the examining paragraph sizes and paragraph text patterns; and providing the document summary information for the mobile communication device.

5. The computer program product of claim 4, wherein said selecting the plurality of summary entries from the electronic document based on differences in content properties comprises determining if the content properties include at least one of text formatting, paragraph alignments or indents and in response selecting the plurality of summary entries based on differences in said at least one of text formatting, paragraph alignments or indents; and otherwise selecting the plurality of summary entries based on differences in said paragraph sizes.

6. A method of generating summary information for an electronic document, comprising:

identifying an electronic document to determine whether the electronic document is a structured document, an unstructured document or an unformatted document;

generating document summary information having a plurality of summary entries selected from contents of the electronic document based on the determining step, wherein the generating document summary information includes determining:

if the electronic document is a structured document by examining whether the electronic document contains content structure which includes a table of content, a plurality of spreadsheet worksheets, and/or a plurality of document pages, for the electronic document containing a table of content, selecting the plurality of summary entries from the electronic document based on top level entries of the table of content, for the electronic document containing a plurality of spreadsheet worksheets, selecting the plurality of summary entries from the electronic document containing one entry for each worksheet in the spreadsheet document, and for the electronic document containing a plurality of document pages, selecting the plurality of summary entries which correspond to contiguous ranges of pages in the electronic document;

if the electronic document is an unstructured document by examining changes in formatting of text in the electronic document, wherein the formatting of text includes font properties, paragraph alignment and indentation, and text properties, selecting the plurality of summary entries from the electronic document based on the examining changes in the formatting of text, and wherein the font properties includes font names, text font sizes, text font weights, and text font styles;

otherwise if the electronic document is an unformatted document by examining paragraph sizes and paragraph text patterns, selecting the plurality of summary entries from the electronic document based on the examining paragraph sizes and paragraph text patterns.

7. The method of claim 6, further comprising: providing the summary information in response to a request for the electronic document by a mobile communication device.

8. The method of claim 6, wherein said selecting the plurality of summary entries from the electronic document based on differences in content properties comprises determining if the content properties include at least one of text formatting, paragraph alignments or indents and in response selecting the plurality of summary entries based on differences in said at least one of text formatting, paragraph alignments or indents; and otherwise selecting the plurality of summary entries based on differences in said paragraph sizes.

9. A server for generating summary information for electronic documents, comprising:

a memory;

a document service process for receiving a request from a user of a mobile communication device for document summary information of an electronic document;

a structured document summarization process for determining whether an electronic document is a structured document by examining whether the electronic document contains content structure which includes a table of content, a plurality of spreadsheet worksheets, and/or a plurality of document pages, for the electronic document containing a table of content, selecting a plurality of summary entries from the electronic document based on top level entries of the table of content, for the electronic document containing a plurality of spreadsheet worksheets, selecting the plurality of summary entries from the electronic document containing one entry for each worksheet in the spreadsheet document, and for the electronic document containing a plurality of document pages, selecting the plurality of summary entries which correspond to contiguous ranges of pages in the electronic document;

an unstructured document summarization process for determining whether an electronic document is an unstructured document by examining changes in formatting of text in the electronic document, wherein the formatting of text includes font properties, paragraph alignment and indentation, and text properties, selecting the plurality of summary entries from the electronic document based on the examining changes in the formatting of text, and wherein the font properties includes font names, text font sizes, text font weights, and text font styles;

an unformatted document summarization process for determining whether an electronic document is an unformatted document by examining paragraph sizes and paragraph text patterns, selecting the plurality of summary entries from the electronic document based on the examining paragraph sizes and paragraph text patterns;

wherein the generating document summary information includes an assemblage of the plurality of summary entries selected from contents of the electronic document based on the determination whether the electronic document is a structured document, an unstructured document or an unformatted document; and the document service process for transmitting the document summary information to the mobile communication device.

10. A system which facilitates the communication of summary information for electronic documents to mobile communication devices, comprising:

a server having:

a memory;

a structured document summarization process for determining whether an electronic document is a structured document by examining whether the electronic document contains content structure which includes a table of content, a plurality of spreadsheet worksheets, and/or a plurality of document pages, for the electronic document containing a table of content, selecting the plurality of summary entries from the electronic document based on top level entries of the table of content, for the electronic document containing a plurality of spreadsheet worksheets, selecting a plurality of summary entries from the electronic document containing one entry for each worksheet in the spreadsheet document, and for the electronic document containing a plurality of document pages, selecting the plurality of summary entries which correspond to contiguous ranges of pages in the electronic document;

an unstructured document summarization process for determining whether an electronic document is an unstructured document by examining changes in formatting of text in the electronic document, wherein the formatting of text includes font properties, paragraph alignment and indentation, and text properties, selecting the plurality of summary entries from the electronic document based on the examining changes in the formatting of text, and wherein the font properties includes font names, text font sizes, text font weights, and text font styles;

an unformatted document summarization process for determining whether an electronic document is an unformatted document by examining paragraph sizes and paragraph text patterns, selecting the plurality of summary entries from the electronic document based on the examining paragraph sizes and paragraph text patterns;

wherein the generating document summary information includes an assemblage of the plurality of summary entries selected from contents of the electronic document based on the determination whether the electronic document is a structured document, an unstructured document or an unformatted document; and a wireless communication network which communicates the document summary information to a mobile communication device in response to a request for the electronic document.

11. The system of claim 10, further comprising: the mobile communication device which receives the document summary information in response to the request for the electronic document.

* * * * *

UNITED STATES PATENT AND TRADEMARK OFFICE
CERTIFICATE OF CORRECTION

PATENT NO.      : 7,421,652 B2                                              Page 1 of 1
APPLICATION NO. : 10/693736
DATED           : September 2, 2008
INVENTOR(S)     : Yuan and Sylthe It is certified that error appears in the above-identified patent and that said Letters Patent is hereby corrected as shown below:

In column 16, claim 6, line 48, delete "wherein the generating document summary information" and insert -- wherein the generating of the document summary information --

Signed and Sealed this

Twenty-fourth Day of February, 2009

JOHN DOLL
*Acting Director of the United States Patent and Trademark Office*